Sept. 22, 1964 J. A. MASON ETAL 3,149,706
FRICTION COUPLING
Original Filed March 30, 1961 3 Sheets-Sheet 1
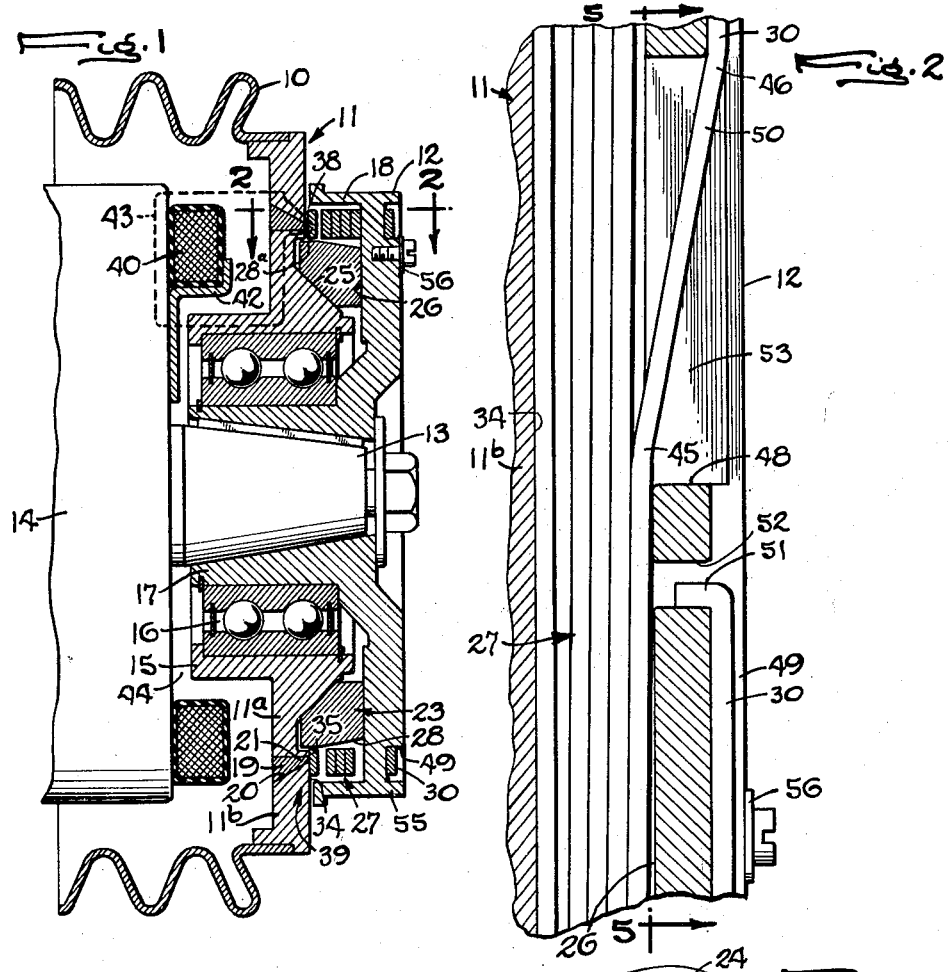
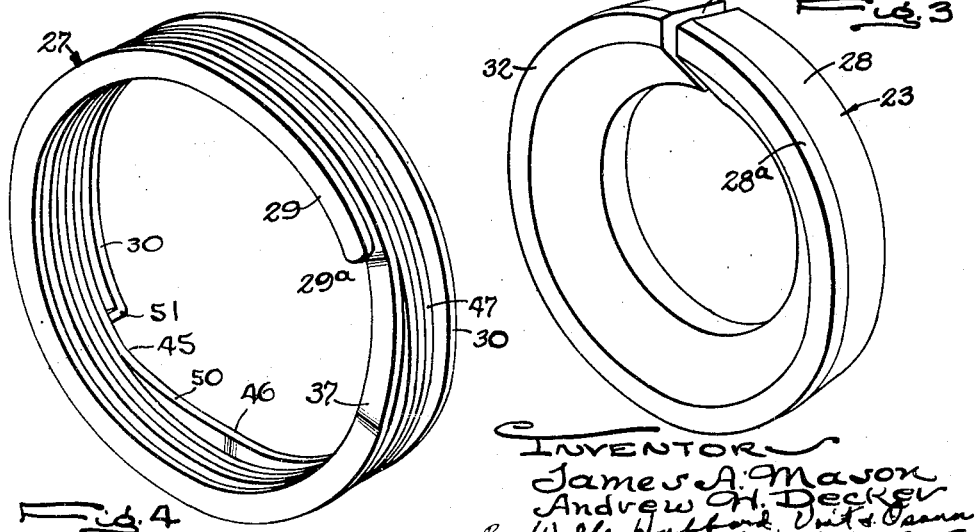
INVENTOR
James A. Mason
Andrew H. Decker
By Wolfe, Hubbard, Voit & Osann
ATTORNEY Sept. 22, 1964    J. A. MASON ETAL    3,149,706
FRICTION COUPLING
Original Filed March 30, 1961    3 Sheets-Sheet 2
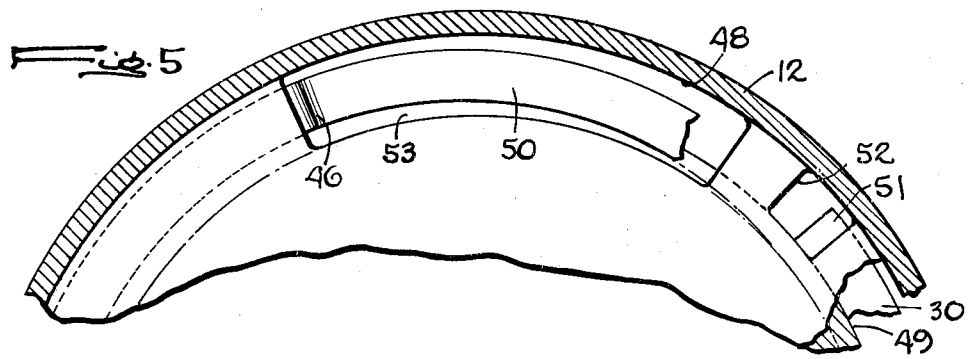
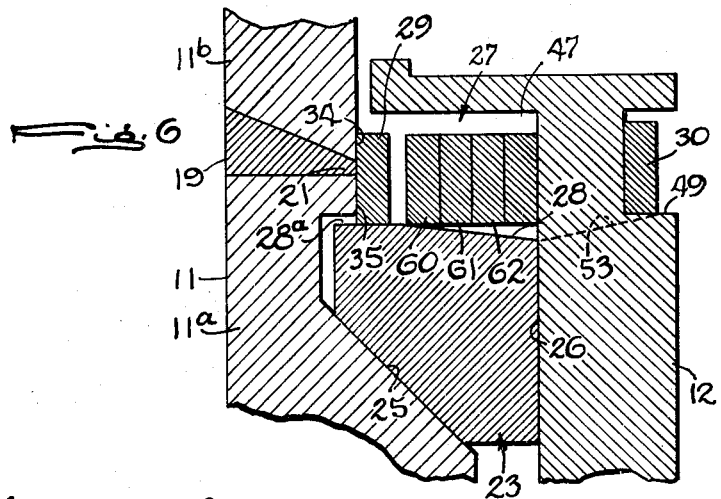
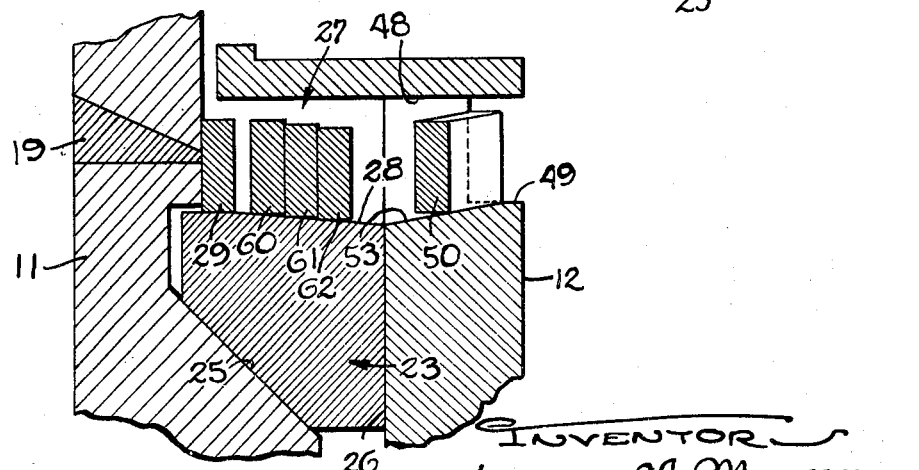
INVENTORS
James A. Mason
Andrew H. Decker
By Wolfe, Hubbard, Voit & Osann
ATTORNEYS Sept. 22, 1964 J. A. MASON ETAL 3,149,706
FRICTION COUPLING
Original Filed March 30, 1961 3 Sheets-Sheet 3
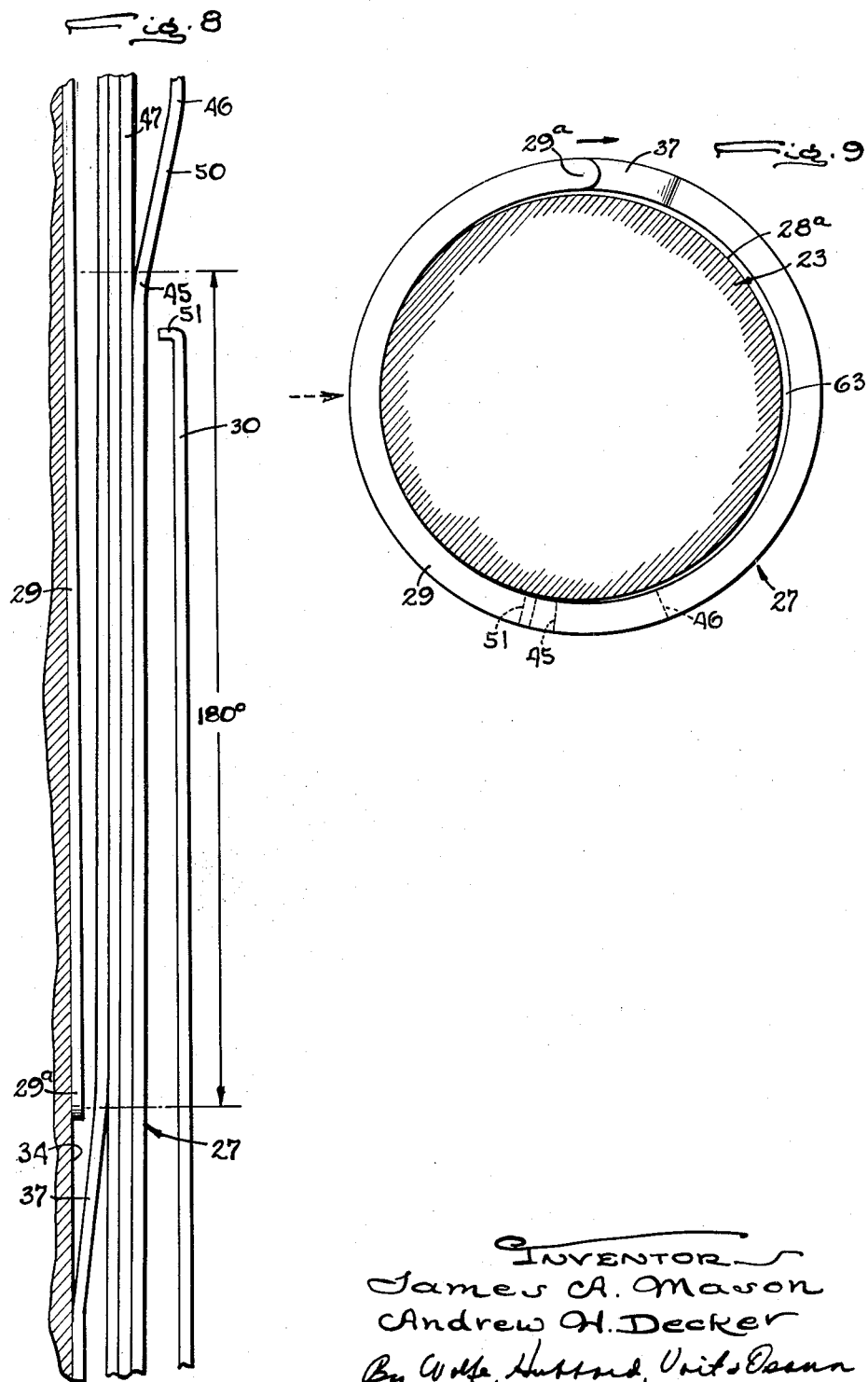
INVENTORS
James A. Mason
Andrew H. Decker
By Wolfe, Hubbard, Voit & Osann
ATTORNEYS United States Patent Office 3,149,706
Patented Sept. 22, 1964

3,149,706
FRICTION COUPLING
James A. Mason, Cleveland, Ohio, and Andrew H. Decker, Beloit, Wis., assignors to Warner Electric Brake & Clutch Company, South Beloit, Ill., a corporation of Delaware
Continuation of application Ser. No. 99,620, Mar. 30, 1961. This application June 25, 1963, Ser. No. 290,897
5 Claims. (Cl. 192—35)

This invention relates to friction clutches and brakes of the so-called coil type in which a free floating arcuate band or shoe is pressed radially into gripping engagement with relatively rotatable surfaces by a helical coil of resilient wire telescope with the band and wound and unwound under the control of a pilot clutch which is preferably controlled magnetically. The invention has more particular reference to such a coupling in which the band and the opposed surfaces of the actuator coil constitute auxiliary friction clutches for deriving from the relatively rotating parts an additional torque which supplements the pilot torque in changing the diameter of the coil to actuate the band.

The primary object is to provide a coupling of the above character by which the pilot torque may be amplified in a substantially greater ratio than has been possible heretofore.

Another object is to provide such a clutch in which pilot clutch torque and therefore the total output torque build-up progressively until the prevailing load is overcome.

A further object is to engage the auxiliary pilot clutches successively during activation of the coupling so that each clutch acts as a pilot for the next thus progressively amplifying the coil actuating torque.

Still another object is to provide a coupling of the above general character in which a smooth and rapid build-up of the output torque is achieved by virtue of the novel angular spacing of the free and anchored ends of the actuator coil.

The invention also resides in the simple and effective manner of producing the successive engagement of the pilot clutches.

Other objects and advantages of the invention will become apparent from the following detailed description taken in connection with the accompanying drawings, in which—

FIGURE 1 is a fragmentary diametrical section of the improved friction coupling and its mounting.

FIG. 2 is a fragmentary section taken along the line 2—2 of FIG. 1.

FIG. 3 is a perspective view of the friction band or shoe.

FIG. 4 is a perspective view of the coil for actuating the band.

FIG. 5 is a section taken on the line 5—5 of FIG. 2.

FIGS. 6 and 7 are views similar to FIG. 1 showing different positions of the parts.

FIG. 8 is a fragmentary development view of the actuator coil.

FIG. 9 is an end view of the coil.

While the invention is applicable to friction couplings of both the expanding and contracting types, a clutch of the contracting band type is shown in the present instance arranged to transmit rotary power from a V-belt pulley 10 on a driving member on disk 11 to a driven member or disk 12 on a shaft 13 projecting from a stationary support 14. The pulley, which may be composed of magnetic material, telescopes with the support 14 at one end and at the other end is fixed to the outer edge of the disk 11 whose hub 15 is pressed onto the outer race ring of an anti-friction bearing 16 which sustains the radial load and also axial thrust. The inner race ring of the latter is pressed onto the hub 17 of the disk 12 which hub is keyed or otherwise fixed to the driven shaft 13. The disk may be composed of nonmagnetic metal or plastic material and carries at its outer edge a right angular flange 18 turned inwardly to a point close to the driving disk 11.

Herein, the driving disk is divided into inner and outer parts 11$^a$ and 11$^b$ magnetically separated by a ring 19 of nonmagnetic metal such as copper filling a groove 20 and brazed to the walls thereof which converge axially toward each other to an apex 21. The latter is of narrow radial width and faces toward the driven disk 12 of the clutch.

Frictional coupling of the driving and driven disks is effected by a ring-like friction band or arcuate shoe 23 divided by one or more gaps 24 (FIG. 3) so as to be expansible and contractible radially into and out of gripping engagement with surfaces 25 and 26 formed on the driving and driven disks. While the band may comprise a plurality of segments, it is preferably a single piece ring split at one point. It is composed of any well known brake lining material such, for example, as a composition known as 610–147 sold by American Brake Block Company or compositions known as G10 or G11 sold by Spalding Fibre Company, Inc.

The cross-sectional shape of the band conforms to the contour of the driving and driven surfaces 25 and 26 which in the present instance converge inwardly so as to provide a wedging action for increasing the gripping force when the band is pressed inwardly and thus contracted to engage the clutch. Such contraction is effected in the contacting type of clutch by winding up a coil 27 of spring wire wrapped helically around the outer surface 28 of the band in a direction to wind up and contract the coil when the end turn 29, which is left free, is turned in the direction of rotation of the driving disk 11, the other end turn 30 of the coil being fixed on the driven disk 12. While the wire of the coil may be formed of any desired cross-section, it is preferably rectangular with the longer dimension disposed normal to the coil axis.

In the relaxed condition, the coil telescopes loosely with the band surface 28 as shown in FIG. 1 and the coil extends along the full width of this surface one end of which terminates at the wall 26 on the driven disk 12. In this instance, the other end of the surface 28 is extended beyond the inner face of the driving disk 11 and terminates at a flat end face 32 of narrow radial width formed around the outer edge of the band. The outside diameter of the band is such that with the band seated in the V-groove formed by the driving and driven surfaces 25 and 26 and the actuator coil 27 relaxed, the apex 21 of the nonmagnetic filling 19 will be disposed about midway between the inner and outer edges of the coil turn 29 and opposite edge portions of this turn will be disposed opposite the coplanar faces 34 and 35 on the inner side of the magnetic driving ring 11. By forming a lateral bend 37 (FIG. 4) in the wire at the junction of the first and second turns of the coil, the entire length of the first turn is disposed in an axial plane and thus disposed parallel to the driving surfaces 34 and 35 from which the turn is separated by a narrow gap 38 when the coil is relaxed.

With the end turn 29 thus disposed, it is adapted for use as an armature of a magnet having a flux path of toroidal shape extending through the armature and the opposed faces 34 and 35 on the driving member which constitute the poles of the magnet. The latter and the armature coact to form a pilot friction clutch 39 for utilizing the relative turning of the driving and driven clutch members 11 and 12 to control the winding and unwinding of the actuator coil 27. In this instance, the magnetic flux is created by energization of an annular multiple turn winding 40 encircling and concentric with the shaft 13 and suitably secured to the support 14 as by a flange on a ring 42 bolted to the support which is composed of iron. Thus, as shown in dotted outline in FIG. 1, the flux path 43 extends from the pole face 34 inwardly through the disk 11ª, axially through a narrow gap 44, around the winding 40 through the support 14, axially to the disk 11ᵇ or alternatively to the pulley 10 to the outer pole face 35. The energy required for activating the pilot clutch is so small that the air gaps in the flux circuit may be relatively wide and thus avoiding the necessity for close coupling of the stationary and rotary parts forming the flux circuit.

To anchor the other end of the coil to the driven disk 12, the coil wire is bent laterally in opposite directions as indicated at 45 and 46 (FIG. 2) at the junction of the last turn 30 of the coil and the adjacent turn 47. The intervening length 50 of wire extends diagonally of the clutch axis over an arc of substantial length and is disposed within a window 48 in the outer edge portion of the driven disk 12. Outwardly beyond the window, the end turn 30 is wrapped around a cylindrical surface 49 having a diameter substantially equal to the outside diameter of the band 23. The turn 30 is disposed in a groove defined in this instance by the outer portion 55 of the driven disk 12 and the edge portions of washers 56 bolted against the outer face of the disk.

The extreme end 51 of the wire is bent laterally at right angles and hooked into a slot 52 in the disk so as to engage the end of this slot and anchor the coil end against turning relative to the driven disk during winding up of the coil to actuate the shoe. Under the tension developed during this action, the end turn 30 is drawn inwardly and tightened around the cylindrical surface 49 acting like a capstan in developing a friction force of substantial magnitude acting tangentially of the diagonal length 50 in a direction to reduce the tension of the hook 51. By wrapping the wire about one revolution around the drum 49, it has been found that only about a tenth of the tension in the wire needs to be sustained by the hook.

Contraction of the turn 47 of the actuator into full engagement with the small end of the band surface 28 is accompanied by edgewise inwardly bending of some portion of the wire within or adjacent the window 48. To distribute such bending over a substantial length of the wire, the surface of the disk 12 which forms the inner wall of the window 48 is grooved spirally or preferably beveled as indicated at 53 so that the radius of its inner edge or the intersection with the surface 26 is substantially equal to that of the adjacent end of the surface 28 when the band is fully contracted as shown in FIG. 7. The outer edge of this bevel merges with the cylindrical surface 49. As a result, when the actuator coil is fully contracted, the length of the wire within the window is bent edgewise and spiraled along the bevel 53 as shown in FIG. 5.

With friction anchor thus provided for the end turn 30, it will be apparent that the actual point of anchorage of the wire is at or near the bend 45 (FIG. 8). To achieve the improved action later to be described, the coil comprises a plurality of turns, at least three and preferably four as in the present instance and the point 45 of anchorage is angularly spaced around the clutch axis from the free end 29a of the first turn 29 of the coil. Such spacing is more than a quarter revolution and is preferably about a half revolution as shown in FIG. 8, the effective length of the coil being four and one half turns in the present instance.

Preferably, the walls 25 and 26 of the V-shaped band groove are shaped to enable the band and the engaged surfaces of the turns of the actuator coil 27 to act as auxiliary pilot clutches in developing a friction torque which supplements and amplifies the torque of the magnetic pilot clutch 39 to effect a further wind-up of the coil until the load on the driven shaft has been overcome. To accomplish this, the groove walls 25 and 26 are inclined at different angles so that the wedging of the band into the V-groove develops at the wall 25 a pressure and therefore a friction force which is sufficient to overcome the opposing friction forces at wall 26 and between the band surface 28 and the inner surfaces of the actuator coil. To make this friction torque differential as large as possible for any given angle of the wall 25, the wall 26 is preferably made flat and disposed in an axial plane so as to minimize the pressure developed at the latter wall during wedging of the band into the V-groove.

In order to insure proper release of the clutch under all conditions when the magnet winding 40 is deenergized, the tangent of the angle included between the walls 25 and 26 should be greater than the coefficient of friction of the materials. When the band is composed of ordinary brake lining material, it is desirable to employ an angle of more than thirty degrees and within a range of about thirty to fifty degrees, an angle of about forty-five degrees usually being preferred.

In accordance with the present invention, the opposed surfaces of the band 23 and the turns of the actuator coil 27 are shaped in a novel manner to cause the band and the successive coil turns beginning with the armature or end turn 29 to act as separate pilot friction clutches which become engaged in succession as the coil is wound up following activation of the magnetic pilot clutch 39. As a result, each of such pilot clutches, as it becomes engaged, acts as a pilot for engaging the next pilot clutch so that the total pilot torque and accordingly the output torque of the band clutch build up progressively until the prevailing load is overcome.

This desirable action is achieved simply by making the opposed band and coil surfaces of different contours so that when the actuator coil is relaxed, the successive coil turns will be radially spaced increasing distances from the outer band surface 28 beginning at the armature 29 and progressing preferably throughout the length of the coil to the last active turn 47. Such divergence of the opposed surfaces may be produced simply by tapering the surface 28 and making the coil 27 cylindrical. While the cone angle of the taper may be relatively small, for example on the order of five degrees, it is made about ten degrees in the present instance and extends from a cylindrical part 28ª of the band surface throughout the remaining length of the band or in other words all the way to the driven disk 12. The cylindrical area 28ª is long enough to underlie the end turn 29 of the coil and thus prevent this turn from being urged away from the magnet poles 34, 35 when it becomes contracted under pressure around the band.

*Operation*

When the magnet winding 40 is deenergized with the driving disk 11 rotating, the driven disk 12 will be at rest with the parts positioned as shown in FIG. 1. The actuator coil 27 is relaxed and thus expanded to its free diameter with the free end turn 29 out of rubbing contact with the rotating pole faces 34, 35 of the magnet. Now, when the winding is energized, flux threads the circuit 43 to attract the armature 29 to the pole faces thereby applying a friction torque to this end in a direction to utilize the turning of the driving disk 11 to wind up the actuator coil 27 whose end 51 is anchored on the then stationary driven disk 12. By such winding, the coil is contracted around the band surface, the turn 29 being the first to come against the band to apply radial pressure around the entire periphery of the band and reduce the diameter thereof to wedge the band into the U-groove against the surfaces 25 and 26. Because of the inclination of the coned wall 25, the pressure between the latter and the band is increased by such wedging action, the resulting increase in friction between these parts being sufficient to overcome the friction between the band and the other wall 26 combined with the friction then existing between the band surface 28 and the first turn 29 of the actuator coil. As a result, the band turns with the driving disk and applies a friction torque to the inner surface of the engaged turn 29. This torque is in the same direction as and therefore supplements the torque of the magnetic pilot clutch so as to augment the latter and thereby effect a further winding up of the coil and contraction of the remaining turns 60, 61, 62 and 47 thereof as shown in FIG. 6.

The turn 60 is thus drawn into contact with the tapered band surfaces 28 so as to become effective not only in pressing the band tighter into the V-groove 25, 26 to increase the main clutch torque but also coacts with the band to form a second auxiliary pilot clutch. The latter transmits the motion of the band to the turn 60 in a direction to continue winding of the coil and thereby contract the next turn 61 against the band. The third auxiliary pilot clutch thus becomes effective to further build-up the main clutch torque and also the pilot torque winding up the actuator coil.

If at this time, the main clutch torque is not sufficient to overcome the prevailing load on the driven member 12, the band will continue to turn with the driver 11 and continue the winding of the coil under the action of the magnetic clutch and the auxiliary clutches formed by the surface 28 coacting with the opposed surfaces of the turns 29, 60 and 61. The next turn 62 becomes pressed against the band as shown in FIG. 7 and acts as described above in further augmenting the main and pilot torques.

It will be apparent that after the magnetic pilot clutch 39 has been activated to initiate winding up of the actuator coil and engage the main clutch, the auxiliary pilot clutches become effective as the successive turns of the coil come into contact with the band surface 28. Thus the main and pilot clutch torques build-up progressively until the load is overcome and the driving and driven members are coupled together without further slipping.

As a result, the clutch adjusts itself automatically to the prevailing load on the driven member, the number of the coil turns engaging the drum being determined by the magnitude of the load on the driven member. The latter may be overcome for example when only the turns 29 and 60 are effective as illustrated in FIG. 6. Then, if the load increases, the pilot clutches then in action will effect a further wind-up of the coil until the load change has been overcome. Since the total pilot torque applied to the successive turns 29, and 60–62 increases progressively, it will be apparent that the radial pressures between the respective turns and the band will increase correspondingly.

In spite of the substantial amplification of the pilot torque, the clutch above described releases quickly in response to de-energization of the magnet coil 40. Thus, when the clutch 39 is disengaged, the turn 29 of the actuator coil is free to unwind thus relieving the pressure between this turn and the band. In a similar way, the unwinding progresses through the turns 60–62 until the parts are restored to the positions shown in FIG. 1.

It has been found in practice that the construction of the actuator coil 27 with more than a whole number of turns contributes to the smooth engagement of the clutch and the progressive build-up of the output torque until the prevailing load is overcome. Thus, with the free end 29ª of the coil angularly spaced around the coil axis 180 degrees from the anchor point 45 at the opposite end of the coil (see FIGS. 4, 8 and 9) the actuating and reactionary torques exerted at these coil ends, when the free turn 29 is drawn against the pole faces by the magnet, will be directed in the same direction as shown by the full line arrows in FIG. 9. The resultant of these forces indicated by the dotted arrow is directed across the clutch axis and shifts the coil bodily and transversely to the position shown in FIG. 9 thus bringing the first half of the free turn 29 into engagement with the band surface 28ª while separating the opposite half of the turn from this surface as indicated at 63 in FIG. 9. Since the surface 28ª is turning with the driving member for the reasons above described, the surface 28ª immediately becomes effective against the free end of the coil to initiate the auxiliary pilot action above described in increasing the torque tending to wind-up the coil. As the winding continues, the full length of the turn 29 comes into contact with the surface 28ª and this is followed progressively by the successive engagement of the other turns as above described.

While the coupling above described is intended primarily for more or less instantaneous engagement without appreciable slipping, it is adaptable to regulation of the transmitted torque in proportion to the degree of energization of the pilot clutch 39 within the lower part of the torque range of the coupling. That is to say, the pilot clutch may be energized to such a degree that, in spite of the auxiliary pilot action above described, the force exerted by the actuator coil on the band is not sufficient to pick up the full load. As a consequence, the band slips relative to the driven disk until the energization of the magnet is increased enough to develop the total torque required to overcome the full load without slipping of the main clutch.

This application discloses subject matter common to Robert H. Shoquist application Serial No. 132,613, filed August 21, 1961, and James A. Mason application Serial No. 212,328, filed July 25, 1962, and no claim is made herein to such common subject matter.

This application is a continuation of our copending application Serial No. 99,620, filed March 30, 1961, now abandoned.

We claim as our invention:

1. A friction coupling comprising members relatively rotatable about a common axis and having peripheral friction surfaces spaced along such axis, a radially expansible and contractible arcuate band complementing the contour of and extending loosely around said surfaces for gripping thereof when moved radially and for free angular floating relative thereto when relaxed, a helical actuator coil of resilient wire telescoped with respect to the surface of said band on the side thereof opposite to said friction surfaces and including a plurality of turns, substantially all of which are changeable in diameter to apply radial pressure only to the band to press the same against said friction surfaces, means anchoring one end of said actuator coil to a first one of said relatively rotatable members while leaving the other end of said coil free, means on the other of said relatively rotatable members cooperating with said free end of said coil to form a pilot friction clutch, and means controlling the energization and deenergization of said pilot clutch to control the winding and unwinding of said coil and thereby regulate the application of radial pressure to said band to press the same against said friction surfaces, said band surface and the associated surfaces of successive ones of said plurality of adjacent turns of said coil, when said pilot clutch is deenergized, being in diverging relationship axially away from the free end of said coil and toward said anchored end whereby after engagement of said band by said turns of said coil at its free end following energization of said pilot clutch, the successive ones of said plurality of adjacent turns of said coil come into engagement with said band successively to define auxiliary friction clutches augmenting the torque transmitted by said pilot clutch.

2. A friction coupling as defined in claim 1 wherein said coil, when relaxed, defines a helix of substantially uniform diameter and the portion of the band surface first engaged by the first of said plurality of adjacent turns of the coil is cylindrical and the remaining portion of the band surface is of progressively decreasing diameter.

3. A friction coupling comprising members relatively rotatable about a common axis and having opposed walls coacting to form a V-groove, the wall on a first one of said members being disposed at a substantially greater angle relative to said axis than the other wall, a free floating radially expansible and contractible arcuate band of V-shaped cross-section complementing the cross-section of and loosely seated in said groove, said band having an exposed surface concentric with said axis, an actuator for applying radial pressure to said band to wedge the same into said groove comprising a helical coil telescoped with said band surface, means anchoring one end of said coil on the other of said members, the opposite end turn being free to turn and thereby control the winding and unwinding of the coil, means on said first member cooperating with said free end turn of said coil to form a friction pilot clutch, means controlling the energization and deenergization of said pilot clutch to change the coil diameter and thereby regulate the application of radial pressure to said band and release of said pressure, said exposed band surface and the successive turns of said coil when the latter is free being radially spaced apart different distances increasing progressively from said free coil turn.

4. A friction coupling comprising members relatively rotatable about a common axis and having opposed walls coacting to form a V-groove, the wall on a first one of said members being disposed at a substantially greater angle relative to said axis than the other wall, a free floating radially expansible and contractible arcuate band of V-shaped cross-section complementing the cross-section of and loosely seated in said groove, said band having an exposed surface concentric with said axis, an actuator for applying radial pressure to said band to wedge the same into said groove comprising a helical coil telescoped with said band surface, means anchoring one end of said coils on the other of said members, the opposite end turn being free to turn and thereby control the winding and unwinding of the coil, means on said first member cooperating with said free end turn of said coil to form a friction pilot clutch, means controlling the energization and deenergization of said pilot clutch to change the coil diameter and thereby regulate the application of radial pressure to said band and release of said pressure, said exposed band surface and the successive turns of said coil coacting to form auxiliary pilot clutches which, during the change in the coil diameter engage successively and progressively beginning at said free coil end.

5. A friction coupling comprising members relatively rotatable about a common axis and having peripheral friction surfaces spaced along such axis, a radially expansible and contractible arcuate band complementing the contour of and extending loosely around said surfaces for gripping thereof when moved radially and for free angular floating relative thereto when relaxed, a helical actuator coil including a plurality of turns of resilient wire telescoped with respect to the surface of said band on the side thereof opposite to said friction surfaces and changeable in diameter to apply radial pressure to the band to press the same against said friction surfaces, means anchoring one end of said actuator coil to a first one of said relatively rotatable members while leaving the other end of said coil free, means on the other of said relatively rotatable members cooperating with said free end of said coil to form a pilot friction clutch, and means controlling the energization and deenergization of said pilot clutch to control the winding and unwinding of said coil and thereby regulate the application of radial pressure to said band to press the same against said friction surfaces, said band surface and the opposed surfaces of successive ones of a plurality of adjacent turns of said coil, when said pilot clutch is deenergized, being in diverging relationship axially away from the free end of said coil and toward said anchored end whereby after engagement of said band by turns of said coil following energization of said pilot clutch, the successive ones of said plurality of adjacent turns of said coil come into engagement with said band successively to define auxiliary friction clutches augmenting the torque transmitted by said pilot clutch.

No references cited.